൹nited States Patent Office 3,048,280
Patented Aug. 7, 1962

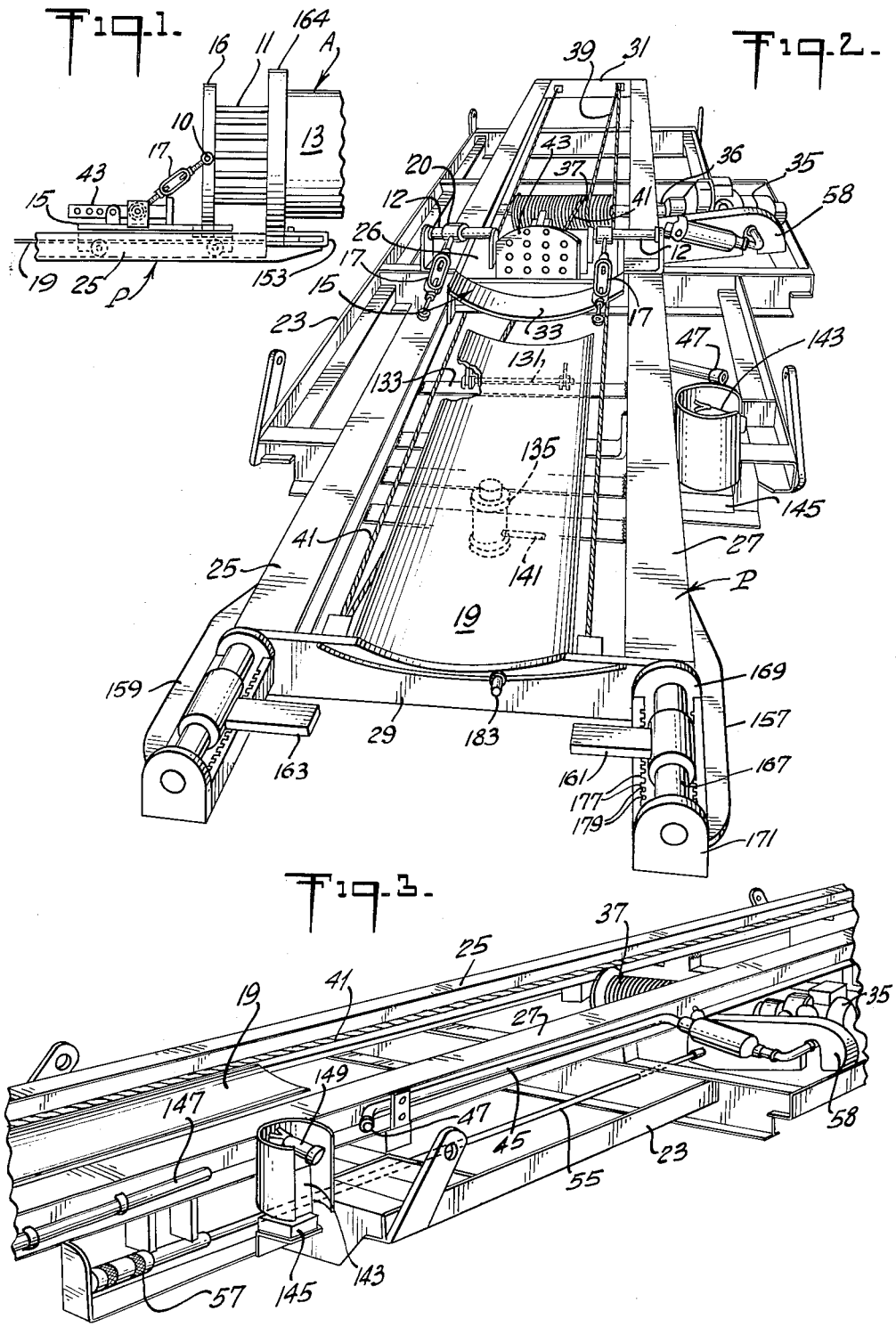

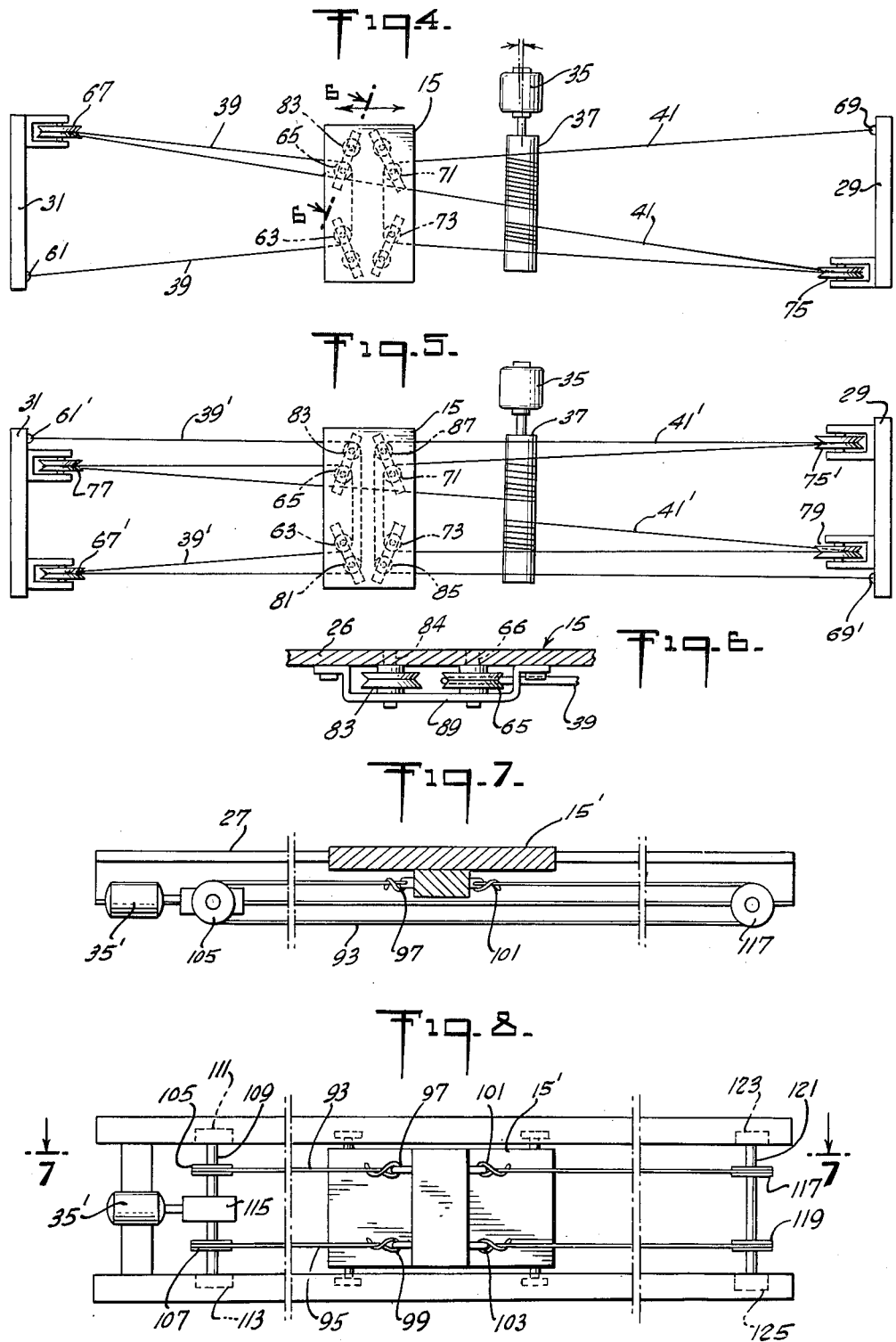

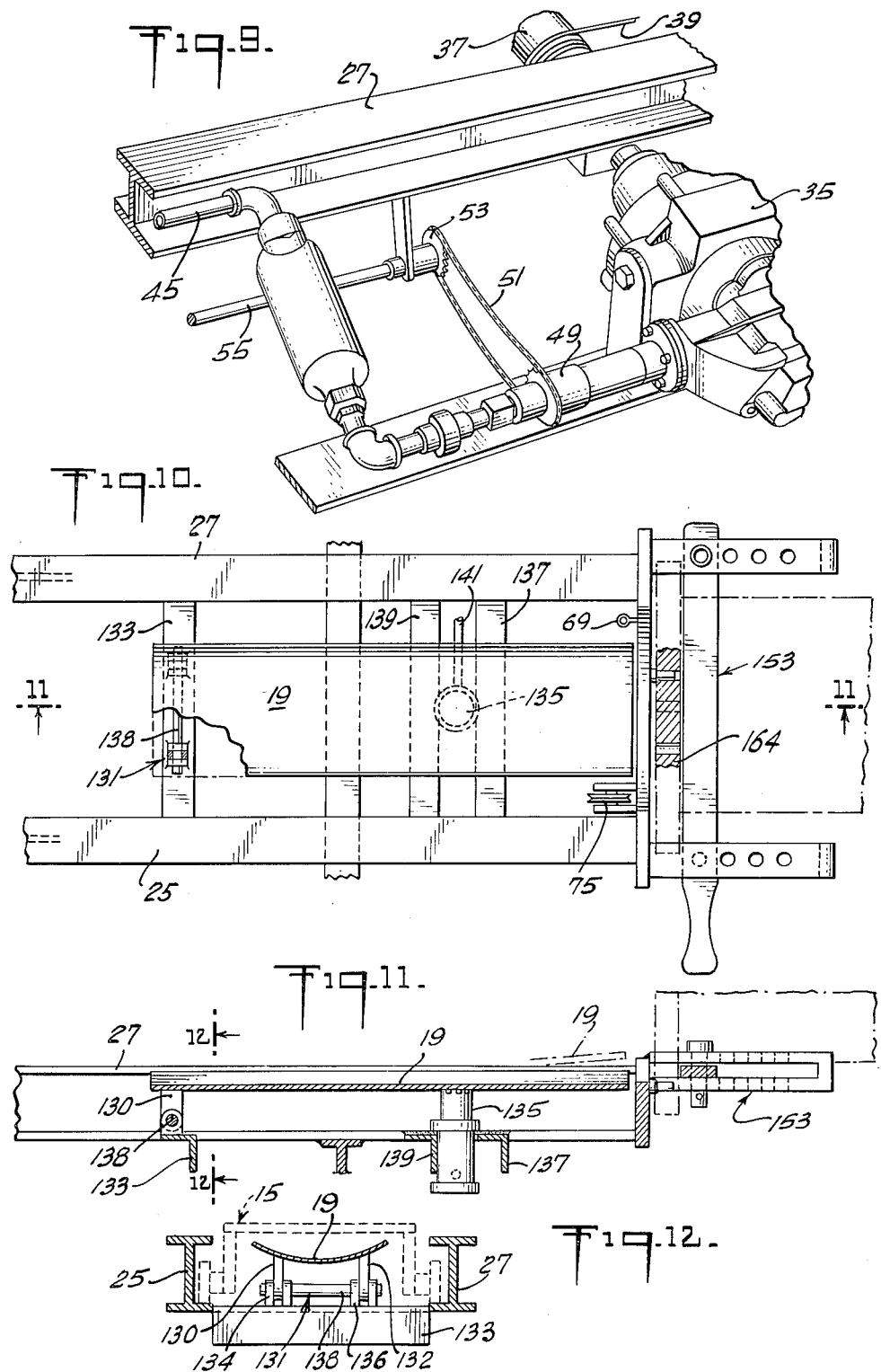

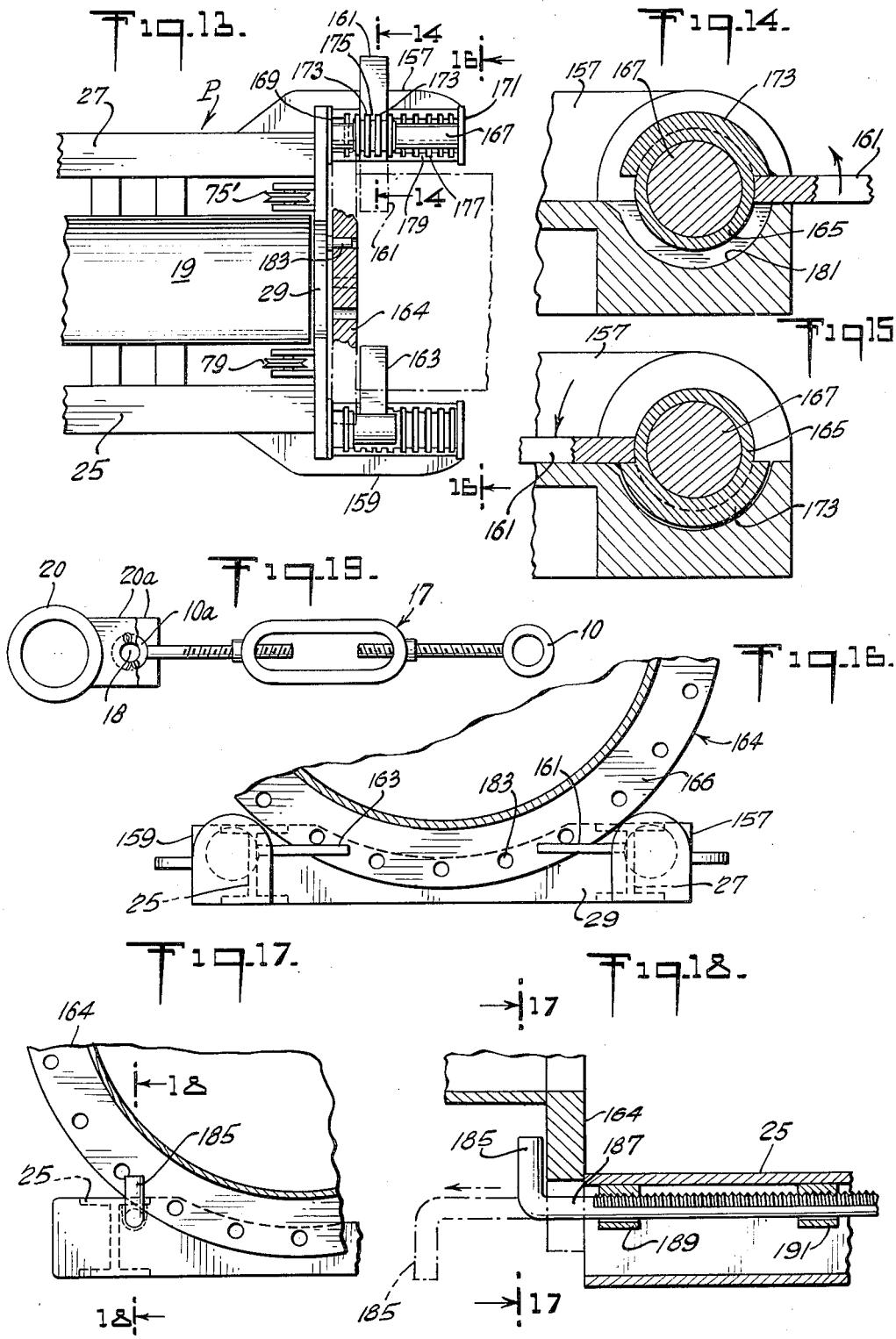

3,048,280
APPARATUS FOR REMOVING HEAT
EXCHANGER TUBE BUNDLES
O. C. Huff and Norman C. Stanley, Port Arthur, Tex.,
assignors to Texaco Inc., a corporation of Delaware
Filed May 9, 1958, Ser. No. 734,337
11 Claims. (Cl. 214—1)

The present invention relates to a novel apparatus for moving a tube bundle out of or into a horizontal heat exchanger shell.

Oil refineries and chemical plants employ many large heat exchangers wherein a cylindrical bundle comprising many metal tubes is located within a cylindrical metal shell, whereby heat exchange may be obtained between a fluid passing through the tubes and another fluid passing around the tubes within the shell. Such heat exchangers are often very large in size, such as 4 feet in diameter and 20 feet long, and may weigh several tons. They may be located near the ground, or elevated as much as 75 feet in the air.

After a heat exchanger has been in use for some time, it is usually necessary to remove the tube bundle from its shell for cleaning and repair. In the past a tube bundle has been removed by employing a large steel scaffolding upon which workmen stand while they jack the tube bundle out of the shell. Sometimes such a scaffolding is a permanent part of the heat exchanger installation; other times it must be built for each tube bundle removal job. In either case, it is expensive and requires a great deal of space which could be used to better advantage for other purposes. Furthermore, much manual labor is required.

Our copending applications Serial No. 666,061, and 697,825 describe removing a tube bundle from a horizontal heat exchanger shell by positioning a portable bundle support or pallet adjacent one end of the shell while suspending it from a crane, holding the pallet firmly in position and dragging the tube bundle from its shell onto a travelling carriage which moves longitudinally along the pallet. Then the tube bundle and pallet together are moved by the crane to a location where reconditioning is to be done. The present application is a continuation-in-part of application Ser. No. 697,825 having a filing date of November 21, 1957.

The apparatus described in our prior application Ser. No. 697,825 employs a lever operated flange clamping mechanism on the end of the pallet which, while extremely effective, is larger and clumsier to operate and more expensive to build than is desired. Additionally, the driving screw whereby the carriage is driven along the pallet is a fairly expensive piece of equipment. The prior application also describes a cradle for the tube bundle which may be moved up and down, but movement is performed manually by applying wrenches to a pair of screws.

The apparatus of our two prior applications is entirely operable and constituted an important advance in the art of maintaining oil refinery equipment. However, further experience has enabled us to devise advantageous improvements which constitute the subject matter of this application.

In accordance with the present invention, instead of pulling a tube bundle out with a motor-driven feed screw, there is provided as an integral part of the bundle support or pallet a motor mechanism which drives a travelling carriage by means of one or more cables operating on a motor-driven sheave mechanism. Additionally, the apparatus is provided with an improved clamping mechanism, comprising a pair of flange-gripping fingers, which is inexpensive in construction and easily and rapidly operated for engaging a heat exchanger shell to support the apparatus firmly in position. Another important improvement is the provision of a cradle for the rear end portion of a tube bundle which may be moved up and down automatically by pumping a pressure fluid into, or bleeding it from, a fluid actuated jacking device.

Still another improvement lies in the provision of novel mechanism for remotely controlling the driving motor from a position near the front end of the pallet which abuts against a heat exchanger shell.

Further details of the invention will be described hereinafter with reference to the accompanying drawings, wherein:

FIG. 1 is a fragmentary schematic side elevational view showing the apparaus in use for pulling a tube bundle from a heat exchanger shell;

FIG. 2 is a perspective view of the apparatus on a larger scale, as viewed from its front end;

FIG. 3 is a fragmentary perspective view of the apparatus as viewed from the right side in FIG. 2;

FIG. 4 is a schematic plan view showing a single rigged cable drive for the carriage;

FIG. 5 is a schematic plan view showing a double rigged cable drive for the carriage;

FIG. 6 is a cross sectional view taken along the line 6—6 in FIG. 4;

FIG. 7 is a schematic longitudinal sectional view, taken along the line 7—7 in FIG. 8, showing a third form of cable drive for the carriage;

FIG. 8 is a schematic bottom view of the apparatus of FIG. 7;

FIG. 9 is a fragmentary perspective view of a part of the apparatus as viewed from the right side of FIG. 2, showing the driving motor and its control mechanism;

FIG. 10 is a fragmentary plan view of a front end portion of the apparatus of FIG. 2, showing details of the movable cradle, a lever type clamping mechanism, and cable rigging points;

FIG. 11 is a longitudinal sectional view taken along the line 11—11 in FIG. 10;

FIG. 12 is a cross sectional view taken along the line 12—12 in FIG. 11;

FIG. 13 is a fragmentary plan view of a front end portion of the apparatus showing the preferred clamping mechanism;

FIGS. 14 and 15 are cross sectional views taken along the line 14—14 in FIG. 13, showing a clamping finger in disengaged and engaged positions, respectively;

FIG. 16 is a cross sectional view taken along the line 16—16 in FIG. 13;

FIG. 17 is a cross sectional view taken along line 17—17 in FIG. 18, showing a modified embodiment of clamping mechanism;

FIG. 18 is a longitudinal sectional view taken along the line 18—18 in FIG. 17; and FIG. 19 is a side elevational view of an improved shackle for connecting the pulling carriage to a tube sheet, as shown in less detail in FIG. 1.

Referring to FIG. 1, there is shown a heat exchanger A with a tube bundle 11 in the process of being removed from shell 13. The tube bundle is pulled out onto a horizontal pallet P by a wheeled carriage 15 upon which the front tube sheet 16 rests, and which is movable lengthwise along the pallet. Carriage 15 is connected to the tube bundle by a pair of shackles 17 slidably and rotatably mounted on horizontal shafts 12 as described in application Ser. No. 697,825. Each shackle 17 comprises a turnbuckle for longitudinal adjustment and an eye 10 through which passes a stud bolt which is threaded into a hole in the edge of tube sheet 16. While coupling of shackle 17 to the tube sheet is shown at the horizontal diameter it can also be done below this point. The shackle 17 is shown in more detail in FIG. 19, wherein the end of the turnbuckle opposite eye 10 has a second eye 10a journalled on a rod 18 extending between and journalled in the two sides of a clevis 20a which projects laterally from a sleeve 20.

A cradle 19 shown in lowered position below the carriage 15 is adapted to be moved upwardly after the carriage has cleared the cradle, for receiving the rear end portion of the tube bundle. Such a rear end portion will include a rear tube sheet ordinarily; but when a tube bundle consisting of U-tubes is being pulled, then the tubes themselves rest on the cradle.

Referring now to FIG. 2, the pallet P comprises a welded support bed 23, as described in the prior applications, carrying on its upper surface a pair of welded-on longitudinally extending parallel beams 25 and 27 which are slightly longer than a tube bundle, project at both ends beyond the ends of the bed 23, and are spaced apart by a distance less than the width of the bed. The beams are additionally connected together at front and rear ends by transverse plates 29 and 31, and between their ends by additional cross braces.

Beams 25 and 27 are I-beams having upper and lower flanges connected by a web, but other equivalent constructions also can be used, such as the pipe and track construction of our application Ser. No. 666,061.

The carriage 15 is mounted between the parallel beams and has four wheels below a flat bed plate 26 rolling on the lower flanges of the beams, as described in our application Ser. No. 697,825. Adjacent its front end the carriage 15 is provided with a narrow transverse saddle 33 to receive the tube sheet 16.

Carriage 15 is moved along the pallet P by a driving motor 35 secured to bed 23 between its ends and operatively connected by a suitable transverse shaft 36 to a cable sheave or drum 37 which extends transversely between the beams 25 and 27 and is journalled in their webs. Two cables 39 and 41 are wound in opposite directions on the drum and are connected through suitable sheaves to the carriage. When the motor 35 is operated in one direction cable 39 is wound onto drum 37 while cable 41 is unwound, the carriage 15 then moving rearwardly along the support. Conversely, when the motor 35 is reversed the drum 37 is rotated in the opposite direction to wind cable 41 thereon and to unwind cable 39, thereby moving the carriage 15 forwardly along the support.

Driving motor 35 can be of any commercially available type such as compressed air, hydraulic, or electric. It should be reversible so that the motor can be operated in one direction to move the carriage 15 forwardly, and in the other direction to move the carriage rearwardly. The particular air motor 35 illustrated is a 5 hp. Gardner-Denver, 5 cylinder, radial-type piston motor, model 60287.

The motor is supplied with compressed air through a pipe 45 carried on the I-beam 27 and having a nipple 47 for attachment to an air hose. Referring to FIG. 9, control of the motor to operate selectively in opposite directions is accomplished by a conventional reversing control valve 49 which is actuated by a driven sprocket 50, a chain 51, and a driving sprocket 53 on the end of a longitudinally extending control rod 55 which extends forwardly along the I-beam 27 and terminates at its forward end in a knurled handle 57 (see FIG. 3). As shown in FIGS. 2 and 3, the chain and sprockets are normally enclosed within a pivoted guard 58.

Three arrangements of cable drives for the carriage 15 are illustrated in FIGS. 4–8. FIG. 4 shows a single rigged cable drive wherein a cable 39 for moving the carriage 15 rearwardly along the pallet has one end fixed at 61 as by an eye-bolt adjacent one side of transverse brace 31. This cable extends forwardly to the carriage 15, passes through a pair of transversely spaced sheaves 63 and 65 mounted for rotation on the lower surface of the carriage and travelling therewith, thence extends rearwardly again through a fixed sheave 67 which is mounted for rotation on the opposite side of brace 31, and then passes forwardly again to the drum 37 to which its end is secured firmly. Rotation of the motor 35 in a direction to wind the cable 39 onto the drum tensions the cable and pulls the carriage 15 rearwardly.

Movement of the carriage 15 forwardly along the pallet is accomplished by tensioning the second cable 41 having a fixed end secured at 69 by an eye-bolt or similar device on the side of transverse brace 29 diagonally opposite 61. Cable 41 passes rearwardly through a pair of transversely spaced sheaves 71 and 73 rotatably mounted on the bottom of carriage 15 and travelling therewith, thence forwardly to a fixed sheave 75 which is rotatably mounted on the side of brace 29 diagonally opposite sheave 67, and from there passes rearwardly to drum 37 upon which its end is secured. When motor 35 is rotated in a direction to wind cable 41 on drum 37, force is exerted on carriage 15 and it is pulled forwardly along the pallet.

When the drum 37 is rotated in either direction, one cable is wound onto the drum while the other is unwound from the drum to permit the carriage to move freely along the pallet. Orderly distribution of the cables on the drum 37 is assured by tilting the rotational axis of the drum 37 slightly from the normal to the longitudinal axis of the pallet, as at an angle of 2°.

FIG. 5 shows a double rigged cable drive wherein cables 39' and 41' have their ends 61' and 69' secured to the cross braces 29 and 31 at diagonally opposite points, and extend through two fixed sheaves 67', 77 and 75', 79, respectively; as well as through two pairs of travelling sheaves 63, 65, 81, 83 for cable 39', and 71, 73, 85, 87 for cable 41'. The drum 37 is inclined slightly as in FIG. 4. With this double cable rigging the operation of the cables is similar to FIG. 4, but much greater force can be exerted on the carriage by the driving motor.

FIG. 6 shows a characteristic detail of all the sheaves on the bottom of carriage 15. The two sheaves 65 and 83 are rotatable on vertical shafts 66 and 84 which are mounted at their ends in the bed plate 26 of carriage 15 and in a U-shaped bracket 89 which bridges the sheaves and is bolted to the bed plate 26.

Referring to FIGS. 7 and 8, a third alternative cable drive mechanism comprises a pair of cables 93 and 95 having their ends firmly secured to eyes on the bottom of carriage 15' at 97, 99, 101, and 103. These cables run over a pair of drive drums such as sheaves 105 and 107 adjacent the rear end of the pallet which are rigidly mounted on a driven shaft 109 journalled at its ends in bearings 111 and 113. A transfer gear box 115 is mounted on the center of shaft 109 and establishes an operable connection between a driving motor 35' and the shaft. The cables 93 and 95 are also mounted on a pair of idler drums such as sheaves 117 and 119 carried on a shaft 121 which is journalled in bearings 123 and 125 near the front end of the pallet.

The novel supporting cradle 19 of the invention will now be described. Referring to FIGS. 2, 10 and 11, cradle 19 is an upwardly concave steel plate which is positioned between the beams 25 and 27 and is hinged near its rear end at 131 to a transverse brace 133 extending between the two beams so that the cradle is movable up and down on the hinges in a vertical plane parallel to the beams. FIG. 12 shows that two laterally spaced ears 130 and 132 fit in two clevises 134 and 136, and a pivot shaft 138 passes transversely through mating bores therein.

At a central point between its ends cradle 19 is supported on its lower side by a hydraulic jack 135 which is mounted rigidly between a pair of transverse angle irons 137 and 139 having their ends secured to the two beams 25 and 27 in such a way that upward movement of the jack raises the cradle to the position shown in dotted lines in FIG. 11, while downward movement of the jack lowers the cradle to a substantially horizontal position below the level of the bottom surface of carriage 15, which is thus able to move over the cradle and reach a position near the front end of the pallet for receiving the front tube sheet of a tube bundle. A suitable hydraulic jack is a Duff Norton, Model 30–H, 30-ton jack.

Jack 135 is connected by a conduit 141 to a hydraulic pump 143 positioned on a bracket 145. To raise the jack and cradle the operator takes a handle 147 from its storage position on the I-beam 27, inserts it in the socket 149, and actuates the pump to increase the pressure and raise the jack. In order to lower the jack and cradle a conventional pressure release valve associated with the pump 143 is actuated so that pressure liquid is bled back into a reservoir (not shown).

The described movable cradle construction is particularly desirable when it comes time to reinsert a tube bundle into its casing. The pallet P carrying the bundle is then positioned against the end of the casing, the jack 135 is operated to raise the cradle 19 to a point such that the bottom of the tube sheet is level with the internal bottom surface of the casing, and the carriage 15 is then moved forward along the pallet to push the tube bundle back into the casing with the pusher 43. After the initial portion of the tube bundle has been inserted and is adequately supported by the casing, the jack 135 is lowered to retract cradle 19 below the level of carriage 15, which is then able to move all the way to the front of the pallet to complete the insertion.

The apparatus which has been described can be clamped to the front of a heat exchanger casing in any suitable way, as by employing a lever construction 153 of the type shown in FIGS. 10 and 11 and more fully described and claimed in our copending application 697,825. However, we have devised two improved and preferred modifications which have the advantages of simplicity, economy and greater ease of operation. As shown in FIGS. 2 and 13 to 18, the front end of pallet P is provided with two forwardly projecting trough shaped brackets 157 and 159 adjacent opposite sides of end plate 29, each of which supports longitudinally adjustable rotatable fingers 161 and 163. Each finger is rotatable into a position of disengagement such that it can then be moved freely lengthwise to a selected position, and then can be rotated in the opposite direction so that mutually cooperating parts on the finger and the bracket engage or mesh with one another to hold the finger firmly in clamping position against a heat exchanger flange 164. Specifically referring to the finger 161 as representative, it includes a cylindrical sleeve 165 which is sleeved over a horizontal shaft 167 having its opposite ends secured in end plates 169 and 171 on bracket 157. Sleeve 165 has a plurality of ridges 173 having a groove 175 therebetween, both the ridges and grooves extending through half or less of the circumference. Similar grooves and ridges 177 and 179 are provided in trough 181 below shaft 167. When the finger 161 is in a position so that the respective ridges and grooves of the sleeve and trough are out of engagement with one another, it can be moved freely along the shaft. When the desired position is reached, the finger is rotated to cause the respective ridges and grooves to mesh into mutual engagement, thus fixing the finger firmly in position.

The manner in which the fingers 161 and 163 are used to clamp the pallet against a heat exchanger flange 164 is shown clearly in FIG. 16, wherein the front face of the flange 164 abuts the end plate 29 while the fingers 161 and 163 bear against the rear face 166. To release the pallet from connection with the flange 164 it is only necessary for the operator to rotate fingers 161 and 163 in opposite directions so that the respective ridges and grooves will disengage and the fingers pass clear of the edges of the flange. As in our copending application 697,825, a retaining pin 183 on the end of the pallet fits into a bolt hole in the flange to help hold the pallet in vertically fixed position.

In the modification shown in FIGS. 17 and 18 a finger 185, corresponding to those of FIG. 13, project radially from a horizontal shank 187 which is threaded through half or less of its circumference and is positioned in a pair of longitudinally spaced half-threaded nuts 189 and 191 welded to the I-beam 25. When the finger 185 is turned to a position for engaging flange 164 the half-threads on shank 187 engage the half-threads of the nuts. When finger 185 is rotated to disengage from flange 164, the mating threads are disengaged from one another and the shank 187 can then be moved longitudnally in the nuts. As in FIG. 13, two of the described fingers 185 are employed.

Obviously, many modifications and variations of the invention, as hereinbefore set forth, may be made without departing from the spirit and scope thereof, and therefore only such limitations should be imposed as are indicated in the appended claims.

We claim:

1. Apparatus for moving a tube bundle out of or into a horizontal heat exchanger shell comprising, in combination, a portable support bed including a pair of parallel spaced beams; a cradle adjacent the forward end of said support bed for receiving the rear end portion of a tube bundle; means for raising and lowering said cradle at will; a movable carriage for receiving the front end of a tube bundle, said carriage lying between said beams and being movable along said beams lengthwise thereof, said carriage and said cradle so cooperating with one another than when said cradle is in lowered position said carriage passes over said cradle to a position adjacent said end of said support bed; a motor driven rotatable cable drive mounted on said support bed and operatively connected to said carriage for moving said carriage along said beams, said cable drive comprising a drum located intermediate the ends of said support bed, a pair of cables wound in opposite directions on longitudinally spaced areas of said drum, separate sheave means on said carriage, and sheaves on said support bed spaced longitudinally thereof on opposite sides of said drum, said cables each passing through one of said sheave means and one of said sheaves and being secured to said support bed at opposite ends thereof; and means carried by said support bed adjacent said end for securing said support bed to a heat exchanger shell.

2. Apparatus in accordance with claim 1, wherein said drum has an axis which is tilted slightly with respect to a line normal to the longitudinal axis of said support bed such that orderly distribution of said cable on said drum without overlapping is assured as either cable is wound onto said drum.

3. Apparatus in accordance with claim 1, also comprising a motor located intermediate the ends of said support bed adjacent to and in driving connection with said drum, control mechanism associated with said motor for selectively controlling the operation of said motor in opposite directions, and mechanism for actuating said control mechanism at will, said last named mechanism extending from a position adjacent said motor to a position adjacent said forward end of said support bed for remotely controlling the operation of said motor.

4. Apparatus for moving a tube bundle out of or into a horizontal heat exchanger shell comprising, in combination, a portable support bed including a pair of parallel spaced beams; a movable carriage for receiving the front end of a tube bundle, said carriage lying between said beams and being movable along said beams lengthwise thereof; tension means on said carriage for connecting said carriage to a tube bundle; mechanism mounted on said support bed and operatively connected to said carriage for moving said carriage along said beams, said last named mechanism comprising a motor driven rotatable cable drive, and cable means connected to said carriage and mounted on said cable drive for movement thereby to drive said carriage along said beams, said cable drive comprising a drum located intermediate the ends of said support bed, and said cable means comprising a pair of cables wound in opposite directions on longitudinally spaced areas of said drum, separate sheave means on said carriage, sheaves on said support bed spaced longitudinally thereof on opposite sides of said drum, said cables each passing through one of said sheave means and one of said sheaves, and being secured to said support bed at opposite ends thereof; and means carried by said support bed adjacent an end thereof for securing said support bed to a heat exchanger shell.

5. Apparatus in accordance with claim 4 wherein each of said cables passes from said drum through a single sheave adjacent the end of said support bed to which said same cable is secured, and thence through a pair of sheaves on said carriage to the secured end thereof.

6. Apparatus in accordance with claim 4 wherein each of said cables passes from said drum through a first sheave adjacent that end of said support bed to which said cable is secured, thence through second sheave means on said carriage, thence through a third sheave adjacent said end, and thence through fourth sheave means on said carriage to the secured end of said same cable.

7. Apparatus in accordance with claim 4, also comprising a motor intermediate the ends of said support bed adjacent to and coacting with said drum, control mechanism associated with said motor for controlling the movement of said motor in opposite directions, and mechanism extending from a position adjacent said motor to a position adjacent the forward end of said support bed for remote control of said motor.

8. Apparatus for moving a tube bundle out of or into a horizontal heat exchanger shell comprising, in combination, a portable support bed including a pair of parallel spaced beams, a pair of projecting rotatable fingers carried on one end of said support bed and mounted for movement both rotationally and lengthwise of said support bed, said fingers and the portion of said support bed adjacent thereto having mutually cooperating ridges and grooves so constructed and arranged that said ridges and grooves mesh with one another when said finger is rotated into clamping position and that said ridges and grooves are disengaged from one another when said finger is rotated out of clamping position, whereby said finger is then movable lengthwise of said support bed.

9. Apparatus in accordance with claim 8, also comprising a pin projecting from said support bed adapted to fit within a bolt hole in the flange of a heat exchanger shell.

10. Apparatus for moving a tube bundle out of or into a horizontal heat exchanger shell comprising, in combination, a portable support bed including a pair of parallel spaced beams; a cradle adjacent the forward end of said support bed for receiving the rear end portion of a tube bundle, said cradle extending lengthwise of said support bed, the front end of said cradle being free for movement up and down, the rear end of said cradle being hinged to said support bed; means for raising and lowering said cradle at will comprising a fluid actuated jack on said support bed below said cradle at a position remote from said rear end; a movable carriage for receiving the front end of a tube bundle, said carriage lying between said beams and being movable along said beams lengthwise thereof, said carriage and said cradle so cooperating with one another that when said cradle is in lowered position said carriage passes over said cradle to a position adjacent said end of said support bed; mechanism for moving said carriage along said beams; and means carried by said support bed adjacent said end for securing said support bed to a heat exchanger shell.

11. Apparatus for moving a tube bundle out of or into a horizontal heat exchanger shell comprising, in combination, a portable support bed including a pair of parallel spaced beams; a cradle adjacent the forward end of said support bed for receiving the rear end portion of a tube bundle; means for raising and lowering said cradle at will; a movable carriage for receiving the front end of a tube bundle, said carriage lying between said beams and being movable along said beams lengthwise thereof, said carriage and said cradle so cooperating with one another that when said cradle is in lowered position said carriage passes over said cradle to a position adjacent said end of said support bed; mechanism for moving said carriage along said beams; and means carried by said support bed adjacent said end for securing said support bed to a heat exchanger shell, said last named means comprising a plurality of projecting fingers mounted on the forward end of said support bed and movable in a direction lengthwise of said support bed for accommodating shell flanges of different thicknesses, and mutually cooperating ridges and grooves carried by said fingers and by cooperating parts of said support bed, the construction and arrangement being such that when said fingers are rotated into clamping position said ridges and grooves mesh with one another to clamp said support bed to a flange, and when said fingers are rotated out of clamping position said ridges and grooves are disengaged from one another whereby said fingers can then be moved freely in a direction lengthwise of said support bed.

References Cited in the file of this patent

UNITED STATES PATENTS

| | | |
|---|---|---|
| 1,024,124 | Dietz | Apr. 23, 1912 |
| 1,481,169 | Witte | Jan. 15, 1924 |
| 2,279,340 | Postlewaite | Apr. 14, 1942 |
| 2,298,982 | Smith | Oct. 13, 1942 |
| 2,630,909 | Mariotte | Mar. 10, 1953 |
| 2,633,233 | Berkebil | Mar. 31, 1953 |
| 2,692,565 | Cummings | Oct. 26, 1954 |
| 2,735,554 | Ober | Feb. 21, 1956 |
| 2,743,024 | Schmitt et al. | Apr. 24, 1956 |
| 2,811,240 | Fenton | Oct. 29, 1957 |
| 2,857,922 | Effinger | Oct. 28, 1958 |

FOREIGN PATENTS

| | | |
|---|---|---|
| 586,346 | France | Jan. 3, 1925 |

OTHER REFERENCES

Power Magazine, vol. 59, No. 26; June 24, 1924; pp. 1032, 1033.